June 27, 1967  R. DUMAS  3,328,069
VEHICLE BODIES
Filed Dec. 17, 1965

Inventor
Roger Dumas
Stevens, Davis, Miller & Mosher
Attorneys

United States Patent Office 3,328,069
Patented June 27, 1967

3,328,069
VEHICLE BODIES
Roger Dumas, Neuilly-sur-Seine, France, assignor to Societe Anonyme Simca Automobiles, Paris, France
Filed Dec. 17, 1965, Ser. No. 514,495
Claims priority, application France, Dec. 22, 1964, 999,513
3 Claims. (Cl. 296—65)

The present invention relates to a convertible rear compartment for a motor vehicle.

In passenger vehicles, it is sometimes necessary to provide a supplementary luggage compartment, particularly for bulky objects.

On the other hand, if it is desired to use the rear compartment for passengers, it is necessary to provide a rear seat which may be folded against the backs of the front seats, in order not to damage said rear seat and thus to obtain a greater volume. However, the base of the car body does not have a flat loading surface because of the rise of the chassis which causes a variation in level.

To this end, the present invention has for an object the construction of a rear passenger compartment which may be converted into a luggage compartment having a flat loading surface. It is a further object to obtain the loading surface by means of a false floor constituted by a fixed element on the rise of the chasis and a movable element combined with the rear seat on which it is fixed by means of hinges.

According to the present invention, the seat whose front is supported by two arms pivotally mounted on two side members of the chassis and whose rear rests, by means of spacing members, on a false floor fixed to the chassis, supports in its front part, by means of hinges, a movable false floor element which is arranged between the lower part of the seat reinforcement and the fixed false floor element when the seat is in normal position and which is arranged in line with the fixed false floor element in order to constitute a continuous loading surface for the luggage when the seat is folded forwards against the back of the front seats.

Other characteristics and advantages of the present invention will appear from the following description of an embodiment given solely by way of example, description being made with reference to the attached drawings in which.

Figure 1:
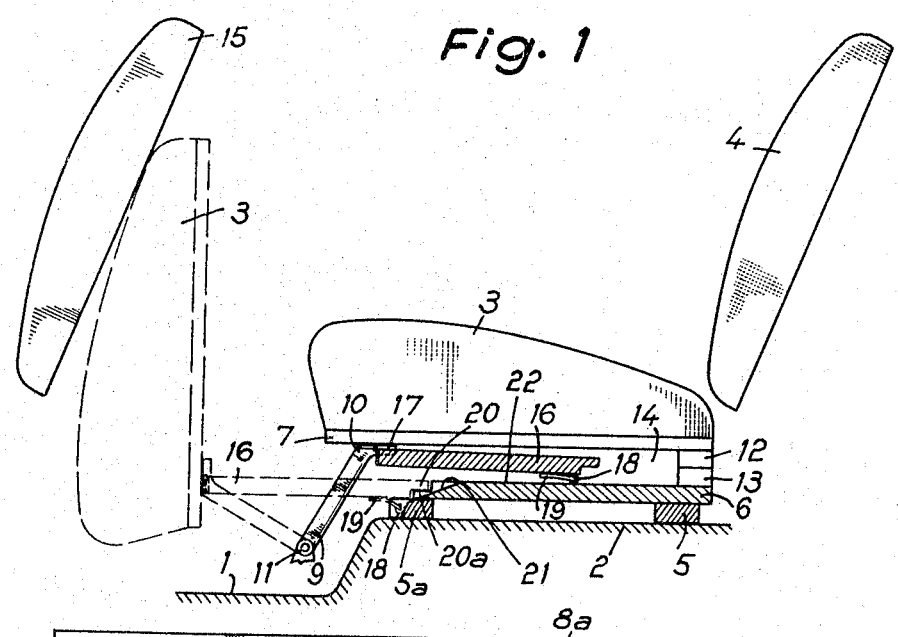
FIGURE 1 shows an elevational view of a rear compartment of a vehicle.

Referring to the drawings, FIGURE 1 shows the rear compartment of a vehicle having a base or floor 1 rearwardly extending by the rise or step 2 of the chassis, on which is located the rear seat comprising a seat 3 and a back 4. A false floor element 6 is fixed by means of cross members 5, on the chassis rise or step 2. The seat 3 is pivotally mounted on side members of the body 8, 8a by arms 9, 9a having at one of their ends, lugs 10, 10a, by means of which they are fixed to the front part of the reinforcing base 7 of the seat 3 and, at the other end, joints 11, 11a, by which they are mounted on the side members 8, 8a, (FIGURES 1 and 2).

The seat 3 may thus be arranged in normal position as shown in solid lines in FIGURE 1, where its rear part rests on cross members 12, 13 leaving a space 14 between the base of the seat and the fixed false floor element 6. When folded forward, as shown in dashed lines in FIGURE 1, the seat 3 is supported against the back 15 of the front seat.

Figure 2:
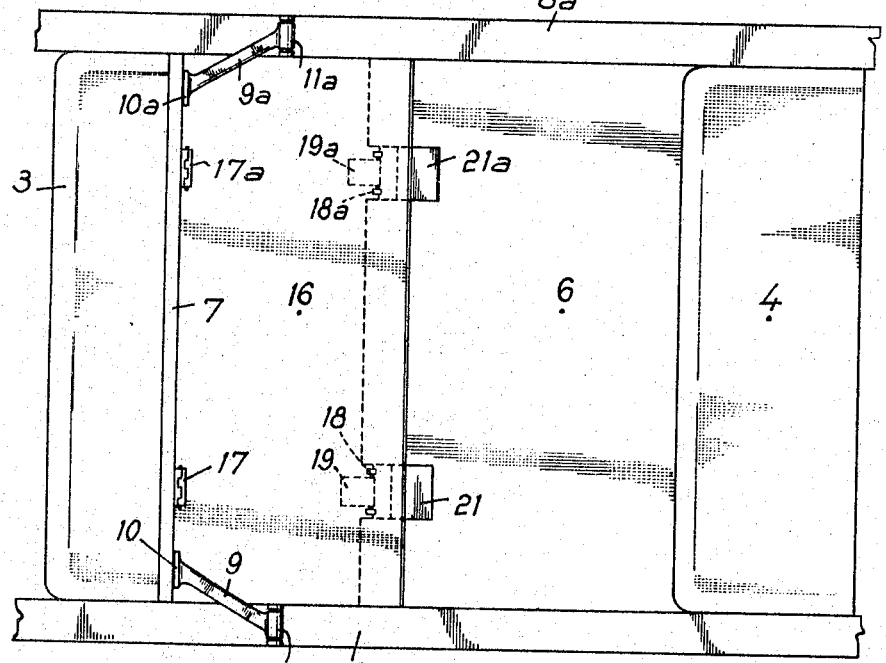
FIGURE 2 shows a plan view of the same compartment with the seat being folded forward for the loading of luggage.

To the front part of the seat 3, on the base of the reinforcement 7, a false floor element 16 is articulated by means of hinges 18, 18a, FIGURES 1 and 2.

The false floor element 16 which is located between the base of the reinforcement 7 of the seat and the fixed false floor element 6 for the normal position of the seat, rests on said false floor element 6 by means of rollers 18, 18a which are mounted on support lugs 19, 19a fixed to said movable false floor element 16.

When the seat 3 is folded forward, for loading the luggage, as shown in FIGURE 2 and in dashed lines in FIGURE 1, the movable false floor element 16 is located in line with the false floor element 6 in order to constitute a flat continuous loading surface.

To this end, the false floor element 16 and the fixed false floor 6 have recesses or notches 20, 20a on their opposite edges in such a manner that the element 16 rests on the element 6.

Opposite the rollers 18, 18a carried by the lugs 19, 19a, the edge of the fixed false floor element 6 connected with the element 16 and the support cross member 5a have sloping ramps 31, 21a for guiding the rollers 18, 18a which are conformed in shape in order to ensure the raising and lowering of the movable false floor element 16, with respect to the fixed element 6 and to ensure its guiding towards the upper surface 22 of said element.

I claim:

1. A motor vehicle having a convertible rear compartment comprising a rear seat and a front seat means for folding the rear seat forwardly against the back of the front seats, two arms supporting the front of said seat, means pivoting said two arms on two side members of a vehicle chassis, spacing members for supporting the rear of said seat, said spacing members being located on a fixed false floor element on a rise or step of the chassis, the front part of said seat supporting a movable false floor element by hinges, said movable false floor element being located between the lower part of a seat reinforcement and said fixed false floor element when the seat is in normal position and which is located in line with said fixed false floor element in order to constitute a continuous surface for loading luggage when the seat is folded forward against the back of the front seats.

2. The invention defined in claim 1, wherein said movable false floor element is provided, on its lower face, with lugs supporting rollers which roll over the upper surface of said fixed false floor.

3. The invention defined in claim 2, wherein the edge of said fixed false floor connected to said movable false floor, has sloping ramps for guiding said rollers, said ramps being conformed in shape so that they ensure a raising and lowering of said movable floor with respect to said fixed floor.

References Cited

UNITED STATES PATENTS 2,926,950   3/1960   Hooverson _____ 296—67
3,198,573   8/1965   Betts _____ 296—69

BENJAMIN HERSH, Primary Examiner.

J. H. BRANNEN, Assistant Examiner.